Dec. 23, 1952     R. R. REEVES     2,622,358
DECORATIVE GARNISHING MATERIAL

Original Filed Feb. 21, 1949

RAY R. REEVES,
INVENTOR.

BY
Hazard & Miller
ATTORNEYS

Patented Dec. 23, 1952

2,622,358

UNITED STATES PATENT OFFICE 2,622,358

DECORATIVE GARNISHING MATERIAL

Ray R. Reeves, San Clemente, Calif.

Continuation of application Serial No. 77,505, February 21, 1949. This application September 28, 1950, Serial No. 187,211

5 Claims. (Cl. 41—13)

This invention relates to a decorative or garnishing material and to the method of manufacturing the same. The application is a continuation of my copending application Serial No. 77,505, filed February 21, 1949, now abandoned.

Heretofore, decorating or garnishing materials have been provided for decorating refrigerated meat and delicatessen showcases, store fixtures, and the like, consisting of sections of green sheet rubber which are died out and otherwise formed to resemble parsley leaves or similar greens. Such sections have been either clamped together in a sheet metal clip to form a base or have been mounted in a suitable holder. Usually the sheet rubber is folded before being clamped into the sheet metal base or is rolled before being mounted in the holder. One objection to decorative material of this character resides in the inability to thoroughly clean the material when cleaning is necessary due to the presence of the clamping sheet metal base that holds the material in position. The presence of the folds also prevents adequate cleaning in the cracks and crevices between the folds.

One object of the present invention is to provide an improved decorating or garnishing material of this character which is so designed that it may be easily and thoroughly cleaned whenever occasion requires.

Another object of the present invention is to provide a novel method for manufacturing a material of this character enabling it to be extruded through a die in such a manner as to cause it to have a ruffled appearance at its edges somewhat simulating parsley or similar greens.

With the foregoing and other objects in view, which will be made manifest in the following detailed description and specifically pointed out in the appended claims, reference is had to the accompanying drawings for an illustrative embodiment of the invention, wherein:

Figure 1:
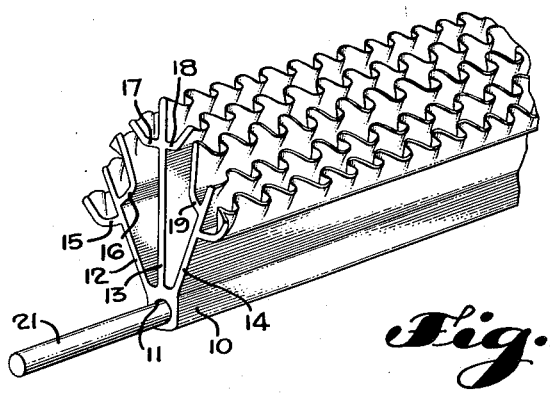
Figure 1 is a perspective view of a portion of decorative material embodying the present invention.
Figure 2:
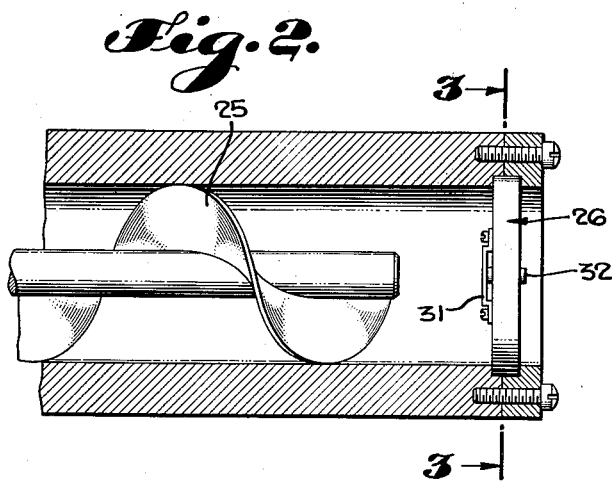
Fig. 2 is a somewhat diagrammatic sectional view of a portion of a rubber extruder or tuber used in manufacturing the material illustrated in Fig. 1.
Figure 4:
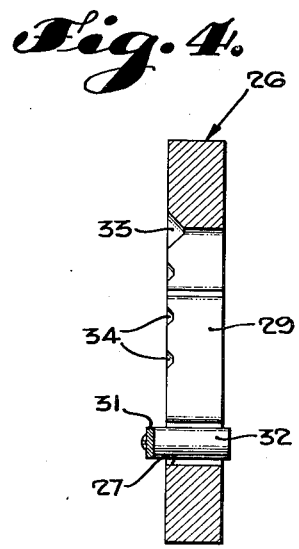
Fig. 4 is a vertical section taken substantially upon the line 4—4 upon Fig. 3.
Figure 3:
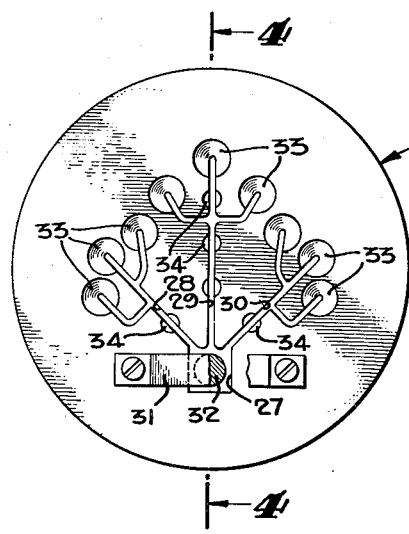
Fig. 3 is a rear view in elevation of the die used in manufacturing the material illustrated in Fig. 1, parts being broken away and shown in vertical section. This view may be regarded as having been taken approximately on the line 3—3 upon Fig. 2.

Referring to the accompanying drawings wherein similar reference characters designate similar parts throughout, the decorative material illustrated in Fig. 1 is formed of green colored rubber or rubber-like material. While natural rubber could be used for this purpose, I find it advantageous to use a mixture of synthetic rubbers which are colored by suitable pigment to render the mixture green in the case that a green decorative material is desired. This material should be of a consistency capable of being extruded through the die of any conventional form of rubber extruder or tuber.

The material illustrated in Fig. 1 consists of a longitudinally extending base 10 which may have a longitudinally extending passage or bore 11 formed therein. On the top of the base and integral therewith there are longitudinally extending fins. While the number of fins may vary I have illustrated the material as having three of such fins indicated at 12, 13, and 14. Each of these fins extends upwardly from the base in a slightly divergent manner with respect to each other and is preferably branched. Thus, the fin 12 may carry two branches 15 and 16 and in a similar manner fin 13 may carry two branches 17 and 18. The branches for the fin 14 are indicated at 19 and 20. These branches as well as the upper ends of the fins are ruffled and present edges which extend back and forth in a transverse direction across the lengths of the fins and branches, respectively. The base 10 may be formed without the passage 11 and can be made solid, but when the passage 11 is formed therein it may receive a stick of doweling 21 or the equivalent which may serve as a stiffener for the base. In lieu of the doweling a malleable metal wire may be employed which, when bent to shape, will retain the bent shape so as to hold the decorative material in a curved manner if this is desired.

The fins and the branches where they join each other are relatively smooth and straight so that whenever it is desired to clean the material it is merely necessary to bend a branch or a fin outwardly from the adjacent branch or fin enabling the juncture between the branches and fins and the juncture between the fins to be easily wiped clean or washed.

The material is made by means of a conventional rubber extruder or tuber wherein the rubber is forced by means of a rotating screw 25 through a die 26. This die may be mounted on the extruder in any conventional manner, and may or may not be heated. Usually in extruders of this type the die and the adjacent structure are heated by means of a surrounding heater to facilitate the proper flow of the rubber therethrough.

The die illustrated has an aperture 27 formed therein through which the base 10 is extruded and three slots indicated at 28, 29, and 30 are connected to the aperture 27 so as to form the fins 12, 13, and 14. The slots 28, 29, and 30 are, in turn, branched so as to form the branches 15 to 20, inclusive, on the finished article.

As a means for retarding flow of the rubber through the aperture 27 a bar 31 may be mounted on the rear or inner face of the die so as to impede the flow of rubber through the aperture 27 and to cause the rate of flow through the aperture to be substantially equal to the rate of flow through the slots 28, 29, and 30 and the lower ends of the branches thereof. This bar may carry a pin 32 which constitutes a core extending through the aperture 27 and which cores out the passage 11. The ruffled edges of the fins and branches are obtained by drilling or otherwise forming recesses 33 on the inner face of the die opposite the outer ends of the fins and branches. These recesses reduce the thickness of the die materially opposite the outer ends of the slots 28, 29, and 30, and opposite the outer ends of the branches connected thereto. Other small recesses 34 may be formed along the lengths of the slots 28, 29, and 30 so as to equalize the flow of rubber through the lower or inner ends of the slots to the flow of rubber through the aperture 27. Thus, the rubber is extruded through the die at substantially the same speed through the aperture 27 as well as through the inner ends of the slots 28, 29, and 30, and the inner ends of the branches of these slots. However, due to the depth of the recesses 33 the rubber is permitted to flow through the outer ends of the slots 28, 29, and 30 and through the outer ends of the branches at a materially higher rate. This rate may be from two to two and one-half, or even three, times the rate at which the rubber is extruded through the aperture 27 and the slots 28, 29, and 30. Consequently, due to the decided inequality in the rate of flow the outer ends of the fins and of the branches will take on the ruffled appearance shown in Fig. 1 on passing through the die. It is not essential that the ruffles be absolutely uniform on all branches and fins, and in some instances, the rate of flow through the outer end of one fin or branch may be somewhat higher or lower than that of others. When this occurs a somewhat staggered formation of ruffles on the various fins and branches is produced which breaks the monotony of a highly uniform arrangement.

It is of course common practice in extruding various materials to take corrective steps in the die so that all portions of the extruded article will flow through the die at the same rate so as to avoid waves. This is accomplished by either drilling recesses such as the recesses 34 in relatively thin openings through the die and impeding the flow through relatively thick or wide openings through the die such as by the bar 31. However, heretofore the effort has uniformly been to promote uniform flow through all portions of the die. In the present instance, however, while uniformity is desirable in the formation of the base 10 the inner or lower ends of the fins 12, 13, and 14, and the inner or lower ends of the branches, non-uniformity of a high degree is desired at the outer ends of the fins and branches in order to produce the ruffled or wavy appearance on their edges.

It will be appreciated that the improved article of manufacture may be advantageously used as an artificial substitute for parsley or other greens, and forms a simple but highly decorative material and that as the material can be continuously and quickly extruded it may be produced in indefinite lengths and cut to the desired length. Any self-curing rubber or rubber-like material may be used and the term "rubber" as hereinafter employed is intended to apply to any rubber or rubber substitute.

While the invention has been described primarily with the manufacture of a garnishing material, it will be appreciated that it may be employed for other purposes, such as for example in the construction of bath mats and the like, where a ruffled edge on a flexible rubber material is desired.

Various changes may be made in the details of construction without departing from the spirit and scope of the invention as defined by the appended claims.

I claim:

1. As a new article of rubber manufacture, a longitudinally extending base having integral therewith a plurality of longitudinally extending fins, the edges of which are decidedly ruffled.

2. As a new article of rubber manufacture, a longitudinally extending base having integral therewith one or more longitudinally extending branched fins, the edges of the fins and of the branches being decidedly ruffled.

3. As a new article of decorative rubber material, a longitudinally extending base having a longitudinal aperture therein, said base having integral therewith one or more longitudinally extending fins having integral branches, the edges of the fins and branches being decidedly ruffled.

4. As a new article of rubber manufacture, a longitudinally extending base having integral therewith a plurality of longitudinally extending fins, the edges of the fins being laterally ruffled, and the fins inwardly of the ruffles being longitudinally flat or straight.

5. As a new article of rubber manufacture, a longitudinally extending base having integral therewith one or more longitudinally extending branched fins, the edges of the fins and of the branches being laterally ruffled but the branches and fins inwardly of the ruffled portions being longitudinally flat.

RAY R. REEVES.

REFERENCES CITED

The following references are of record in the file of this patent:

UNITED STATES PATENTS

| Number | Name | Date |
| --- | --- | --- |
| 2,095,564 | Gleason | Oct. 12, 1937 |
| 2,502,772 | Winstead | Apr. 4, 1950 |